(12) United States Patent
Grohens et al.

(10) Patent No.: US 8,342,803 B2
(45) Date of Patent: Jan. 1, 2013

(54) BLADE WITH A COOLING GROOVE FOR A BLADED WHEEL OF A TURBOMACHINE

(75) Inventors: Regis Grohens, Tournan en Brie (FR); Renaud Gabriel Constant Royan, Sucy en Brie (FR)

(73) Assignee: SNECMA, Paris (FR)

( * ) Notice: Subject to any disclaimer, the term of this patent is extended or adjusted under 35 U.S.C. 154(b) by 582 days.

(21) Appl. No.: 12/367,120

(22) Filed: Feb. 6, 2009

(65) Prior Publication Data

US 2009/0202358 A1  Aug. 13, 2009

(30) Foreign Application Priority Data

Feb. 7, 2008  (FR) ...................................... 08 50766

(51) Int. Cl.
*F01D 5/18*  (2006.01)
(52) U.S. Cl. ...................................... 416/97 A; 415/115
(58) Field of Classification Search ............ 415/115, 415/138; 416/97 R, 97 A
See application file for complete search history.

(56) References Cited

U.S. PATENT DOCUMENTS

| | | | |
|---|---|---|---|
| 6,017,189 A * | 1/2000 | Judet et al. ................. | 416/97 R |
| 6,341,939 B1 * | 1/2002 | Lee ............................ | 416/97 R |
| 6,383,602 B1 * | 5/2002 | Fric et al. ................... | 428/131 |
| 6,893,215 B2 * | 5/2005 | Kuwabara et al. ........... | 415/139 |
| 7,597,536 B1 * | 10/2009 | Liang ........................... | 415/138 |
| 7,766,618 B1 * | 8/2010 | Liang .......................... | 416/97 R |
| 2005/0175444 A1 | 8/2005 | Liang | |
| 2007/0189897 A1 * | 8/2007 | Pietraszkiewicz et al. . | 416/97 R |
| 2008/0050223 A1 * | 2/2008 | Liang ........................... | 415/176 |
| 2008/0085190 A1 | 4/2008 | Liang | |

FOREIGN PATENT DOCUMENTS

| FR | 2 053 813 | 4/1971 |
|---|---|---|
| WO | WO 94/12765 | 6/1994 |

* cited by examiner

*Primary Examiner* — Matthew Landau
*Assistant Examiner* — Joseph C Nicely
(74) *Attorney, Agent, or Firm* — Oblon, Spivak, McClelland, Maier & Neustadt, L.L.P.

(57) ABSTRACT

A blade for a turbomachine bladed wheel is disclosed. The blade includes an airfoil and a platform with at least one air injection passage. The platform including includes a groove running along the pressure side of the airfoil at least in the vicinity of a downstream portion thereof, and formed between the pressure side and a ridge formed on the platform surface at a short distance from the downstream portion of the pressure side. At least one air injection passage is arranged in the groove. Because of the presence of the groove, the air stream injected via the air injection passage(s) is kept close to the pressure side and thus provides effective cooling of the downstream portion thereof.

13 Claims, 3 Drawing Sheets

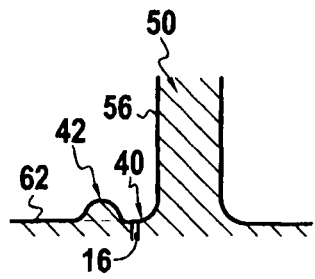
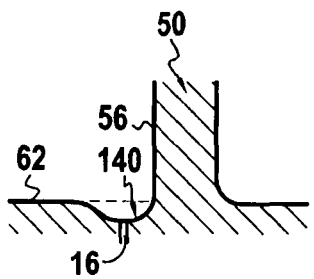
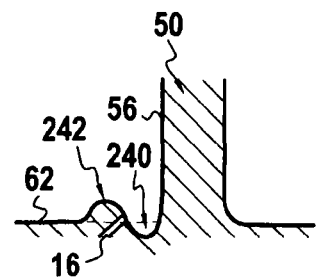
FIG.5  FIG.6  FIG.7
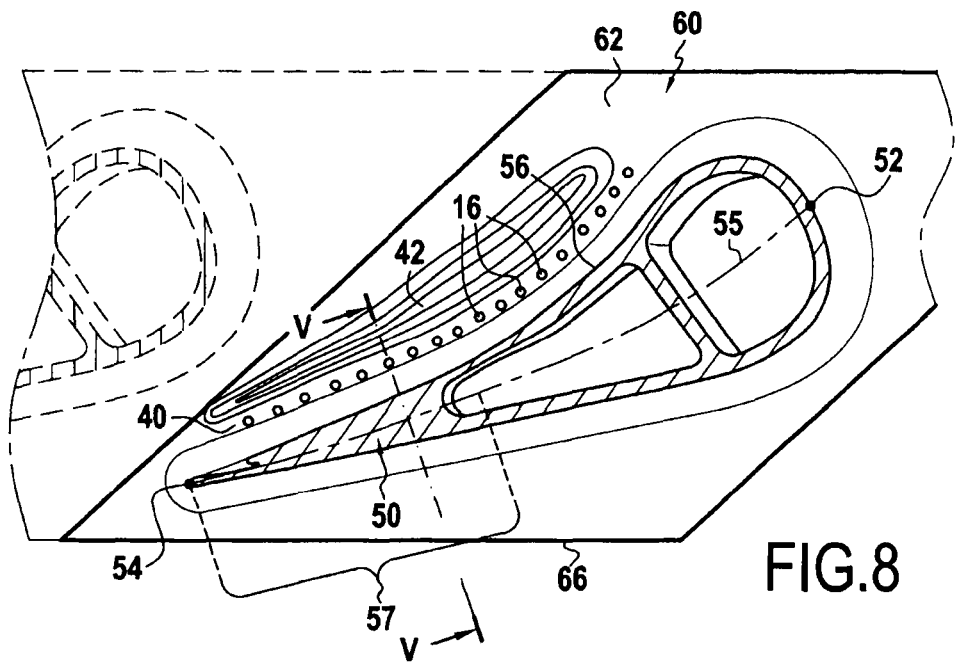
FIG.8
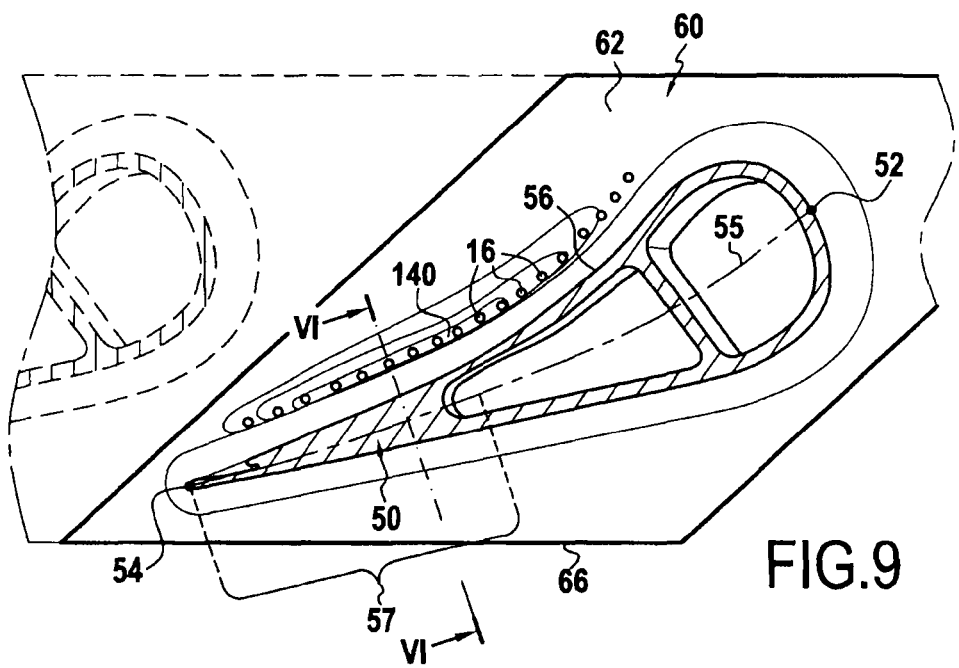
FIG.9

BLADE WITH A COOLING GROOVE FOR A BLADED WHEEL OF A TURBOMACHINE

FIELD OF THE INVENTION

The present invention relates to a blade for a bladed wheel of a turbomachine, the blade comprising an airfoil presenting a pressure side, and a platform extending from one of the ends of the airfoil in a direction that is generally perpendicular to a longitudinal direction of the airfoil, the platform including at least one air injection passage, and more precisely means for implementing to optimize the cooling of the blade by virtue of the stream injected via the injection air passage(s).

BACKGROUND OF THE INVENTION

In known manner, such a blade is generally designed to be placed together with a plurality of substantially identical blades so as to form a ring around an axis of the ring, which ring has the airfoils disposed substantially radially therein, with the platform surface portions of two adjacent blades situated between their respective airfoils defining an inter-airfoil surface. The inter-airfoil surface connects the pressure side of one airfoil to the suction side of the adjacent airfoil in the inter-airfoil channel.

The set of blades around the ring axis serves to constitute a bladed wheel. The bladed wheel may be a moving wheel and thus receive energy coming from the stream or communicates energy to the stream flowing through the bladed wheel; the wheel may alternatively be stationary, in which case it performs a nozzle function of channeling the stream.

The present invention relates to blades that are used in streams at high temperature, in particular at very high temperature, such as higher than 1000 kelvins (K), for example. This applies for example to the blades located in the high-pressure or low-pressure turbine stages of turbojets that are disposed downstream from the combustion chambers thereof.

These high temperatures (and the associated temperature gradients) can sometimes be much greater than the melting temperature of the blade, and they give rise to various problems for blades: a risk of melting; expansion; deformation; the appearance of mechanical stresses; . . . .

In known manner, the cooling of the airfoils and the platforms of blades that are stressed in this manner is implemented by means of air passages formed within the volume of the blades themselves. These passages convey cooling streams towards those portions of the blade that are subjected to the highest levels of thermal or thermomechanical stress.

The trailing edge of the airfoil, and more particularly the portion where the trailing edge of the airfoil joins the surface of the blade platform, where mechanical stresses are very high, forms a portion of the blade that is most particularly exposed and that is referred to as the critical portion of the blade.

The shape and the location of this portion of the blade make it particularly difficult to cool by means of an air stream. That is why, in practice, the cooling of this critical portion is performed poorly, and it reaches high temperatures simultaneously with high levels of stress. That leads to deformation, and in the long run to cracking, and hence to a reduction in the lifetime of the blade.

The above-mentioned difficulty in cooling the trailing edge of the blade by injecting a stream of air is illustrated in particular in FIG. 3.

FIG. 3 is a section through a blade of the type mentioned in the introduction and it shows the behavior of the cooling streams injected by air injection passages situated in the vicinity of the airfoil of the blade, on its pressure side.

The blade shown in FIG. 3 is a blade 10 having an airfoil 50, a platform 60, and a root 66. The blade is presented in section perpendicular to the longitudinal axis of the airfoil 50.

Air passages 16 are formed in the platform 60. They serve to convey cooling air, which air is injected in particular for the purpose of cooling the critical portion of the airfoil. These passages 16 open out through the blade platform into the platform surface 62, along the pressure side 56 of the blade 10.

It should be observed that in this document, the term "air" is used as a generic term, covering a stream of air or any other essentially gaseous stream, such as for example exhaust gas.

FIG. 3 shows the path followed by air streams injected via the air injection passages 16. These streams do not run along the pressure side wall 56, but instead they rapidly become separated therefrom to follow an oblique path downstream and in part towards the suction side 58 of the adjacent airfoil 50.

Because of this oblique path, these streams contribute little to cooling the portion 12 where the trailing edge joins the platform. Only those cooling streams that are conveyed by the passages 16 located furthest downstream along the airfoil 50 contribute to some extent to cooling this critical portion 12 of the blade 10, albeit imperfectly. The cooling streams conveyed by the other passages 16 move away from the pressure side 56 of the airfoil and do not contribute significantly to cooling the critical portion 12 of the blade.

OBJECT AND SUMMARY OF THE INVENTION

A first object of the invention is to provide a blade of the type mentioned in the introduction that is suitable for being used in a high temperature stream, that remains low in cost while also being relatively easy to fabricate, and in which the critical portion is cooled appropriately.

This object is achieved by the fact that in the blade, the platform includes a groove running along the pressure side in the vicinity at least of a downstream portion thereof and formed between the pressure side and a ridge formed on the platform surface at a short distance from said downstream portion of the pressure side, at least one air injection passage being formed in said groove.

The above-mentioned groove constitutes a channel into which the air stream is injected via the air injection passage(s) disposed in the groove. The injected air stream is guided by the walls of the groove to flow along the pressure side. As a result, the phenomenon of the stream separating from the pressure side wall is avoided, and the portion connecting the trailing edge to the platform is cooled effectively.

Thus, the temperature in operation of the critical portion of the blade is lowered. This makes it possible for the lifetime of the blade to be increased. Conversely, it is possible to take advantage of the improved cooling efficiency to reduce the quantity of air that is injected via the air passages, or to reduce the number of air passages.

It should also be observed that this object is obtained simply by virtue of a special shape for the blade platform, and thus advantageously at very little extra cost for the blade (or even with a cost reduction if the number of air injection passages is reduced).

In general, since the groove is formed in the platform, the open side of the groove is directed substantially in the radial direction towards the outside of the bladed wheel, and thus substantially parallel to the axis of the blade. Thus, the outlet(s) of the air injection passage(s) in the groove is/are not directed substantially perpendicularly to the pressure side wall of the blade, in the outgoing direction. The outlets may be directed to form an angle of at least 45°, and preferably close to 90°, and possibly even greater than 90°, relative to said direction.

In an embodiment, the diameter of the air injection holes is small compared with the dimensions of the section of the groove in a plane perpendicular to the general direction of the groove.

In the invention, the groove is formed between the pressure side and a ridge formed on the platform surface at a short distance from said downstream portion of the pressure side. This ridge therefore projects from the surrounding surface of the platform and as a result the groove can be formed, or not, as a depression relative to the platform surface.

The term "short distance" is used herein to mean a distance that is a small fraction of the width of the inter-airfoil channel. By way of example, it is appropriate for the ridge to be spaced apart from the pressure side by no more than one-third of the width of the inter-airfoil channel, and preferably no more than one-fourth of the width of the inter-airfoil channel.

Furthermore, the ridge is preferably provided at a substantially constant distance from the pressure side so that the groove defines a channel of generally constant section.

In an embodiment, the platform surface in the vicinity of a downstream portion of the pressure side is substantially a surface of revolution about the axis of the ring, and the groove is formed as a depression relative to said surface.

Thus, in general, the groove may either be recessed or else at substantially the same level as (or even slightly above) the adjoining surface of the platform, where these two configurations correspond respectively to the two embodiments specified above. When a groove is provided at the same level as the platform surface, that requires a ridge to project from the platform, the groove being thus formed between the ridge and the pressure side wall.

In an embodiment of the invention, the groove is defined on one side by the pressure side and on the other side by the ridge.

In an advantageous embodiment, the extent of the groove in the flow direction of the stream and relative to the neutral fiber of the airfoil, runs from the first quarter of the airfoil to the point of the airfoil that is the furthest downstream. It has been observed that a groove extending over such an interval is particularly effective.

Finally, in one embodiment, the blade has multiple air injection passages distributed along the groove. The presence of multiple passages reduces the risk of turbulence that might be generated if a massive in-rush of air were to be injected via a single air passage. In this particular configuration, the section of the groove may increase going from upstream to downstream so as to enable it to pass a stream of air of increasing flow rate as built up progressively by injecting air via the various air injection passages.

The invention also provides a bladed wheel suitable for being used in a high temperature stream, with a cost price that remains moderate.

This object is achieved by the bladed wheel including a plurality of blades as defined above.

A third object of the invention is to propose a turbomachine of high efficiency, with a cost price that remains moderate. This object is achieved by the turbomachine including at least one bladed wheel as defined above. It should be observed that the bladed wheel could equally well be a rotor wheel or a stator wheel such as a high pressure nozzle in a turbojet.

BRIEF DESCRIPTION OF THE DRAWINGS

The invention can be well understood and its advantages appear better on reading the following detailed description of embodiments given as non-limiting examples. The description refers to the accompanying drawings, in which:

FIGS. 5, 6, and 7 are section views of a blade of the invention, showing three different embodiments; and FIGS. 8 and 9 are views of the inter-airfoil channel between two airfoils in the vicinity of the trailing edge of an airfoil and on the suction side thereof, showing the two embodiments of FIGS. 5 and 6 respectively.

For simplification purposes, when an element appears in more than one Figure, in identical or analogous form, it is given the same reference number in the various figures and the element is described only on the first occasion that it is mentioned.

MORE DETAILED DESCRIPTION

Figure 1:
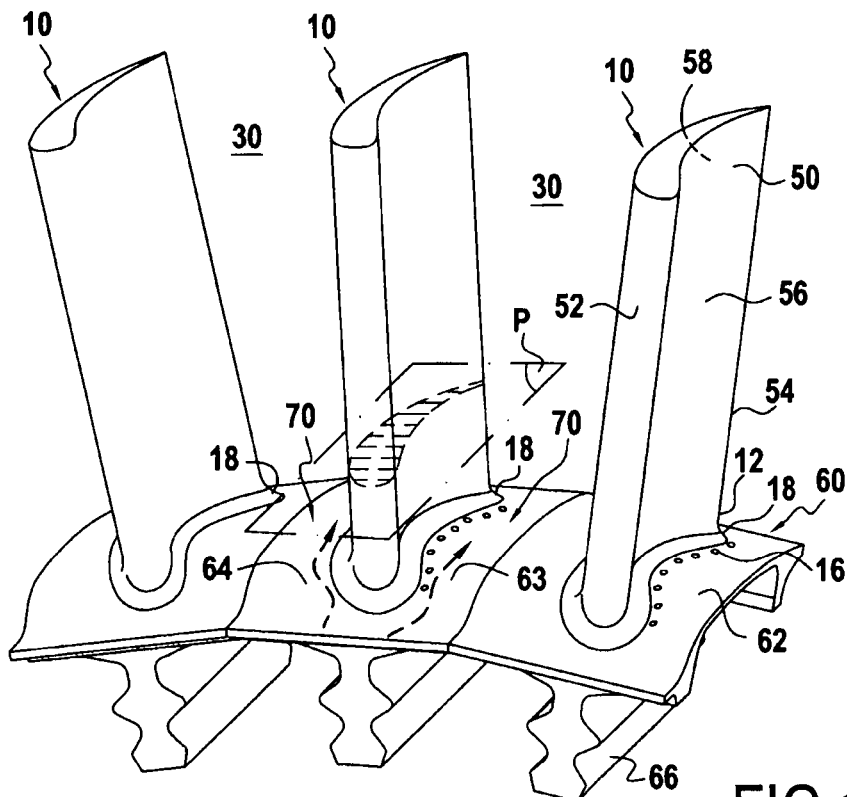
FIG. 1 is a perspective view of three prior art blades in their relative positions when mounted on a bladed wheel.
Figure 2:
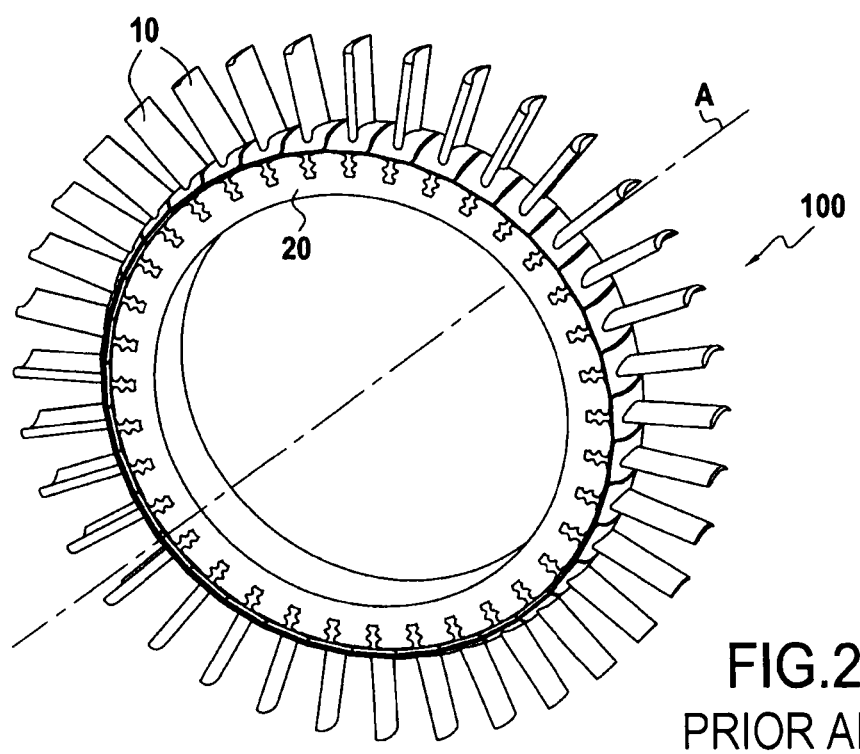
FIG. 2 is a diagrammatic perspective view of the bladed wheel that includes the blades of FIG. 1.

With reference to FIGS. 1 and 2, the general shape of blades for a turbomachine bladed wheel is summarized briefly.

FIG. 1 shows three identical blades 10 forming part of a bladed wheel 100 shown in FIG. 2. Each blade 10 is designed to be assembled with other, identical blades 10 so as to form the bladed wheel 100. This wheel is essentially constituted by the blades 10 mounted on a rotor disk 20. In this bladed wheel 100, the blades 10 are arranged in a ring in axially-symmetrical manner about the axis A of the wheel.

Each blade 10 comprises an airfoil 50, a platform 60, and a root 66. The airfoil has a leading edge 52, a trailing edge 54, a pressure side 56, and a suction side 58. The root 66 serves to fasten the blade on a hub, e.g. the rotor disk 20. The platform 60 extends in a direction that is generally perpendicular to the longitudinal direction of the airfoil 50 and has a top surface 62 beside the airfoil 50. Since the blades 10 are assembled against one another, the top surfaces 62 of their platforms define inter-airfoil surfaces 70 that extend from the pressure side 56 of one airfoil to the suction side 58 of the adjacent airfoil. In the bladed wheel 100, each inter-airfoil surface 70 is made up of a first portion 63 of the top surface of a platform situated on the pressure side of the corresponding airfoil, and a second portion 64 of the top surface of a platform situated on the suction side of the corresponding airfoil. These two portions 63 and 64 run on continuously one from the other so as to provide a substantially leaktight junction between two adjacent blades 10. The platform surface 62 is connected to the outside surfaces of the airfoil 50 via connection surfaces 18 (which are substantially in the form of connection fillets of varying radius).

In addition, to cool the critical zone 12 of the airfoil 50, i.e. the portion of the trailing edge 54 that is situated adjacent to the platform 60, the platform surface 62 has air injection passages 16 formed in the volume of the blade itself.

Figure 3:
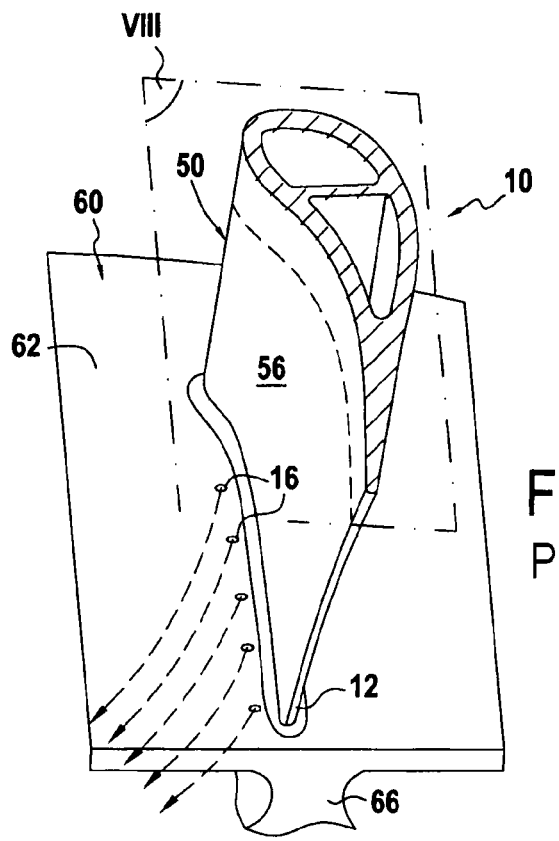
FIG. 3, described above, and FIG. 4 are perspective views of a blade in the vicinity of the trailing edge of its airfoil and on the pressure side thereof, showing the path of the stream injected via the air injection passages, respectively with a prior art blade and with a blade of the invention.

It should be observed that in the examples shown in FIGS. 1 to 3, the inter-airfoil surface 70 is substantially a portion of a surface of revolution about the axis A of the bladed wheel (where the term "surface of revolution" designates a surface generated by rotating a curve about an axis). Such a shape is commonplace for the inter-airfoil surfaces of blades for turbomachine bladed wheels.

The effect produced by a blade of the invention is described below with reference to FIGS. 3 and 4.

Figure 4:
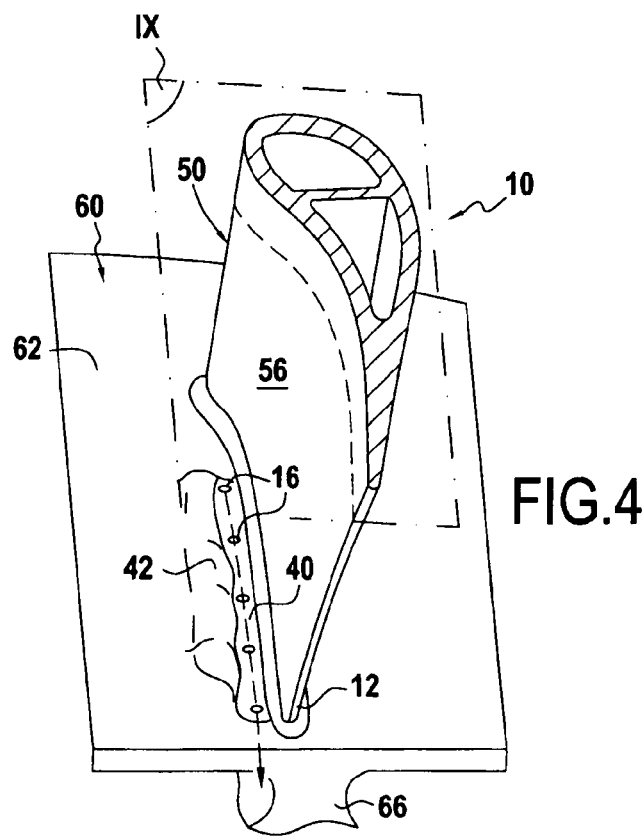

In the blade shown in FIG. 4, a ridge 42 is formed at a substantially constant distance from the pressure side 56 of the airfoil 50. Because of this ridge 42, a groove 40 is formed in the platform surface 62. The groove 40 runs along the pressure side 56 of the airfoil beside its downstream portion and extends between the pressure side 56 and the ridge 42 which together define the groove.

By virtue of this groove 40, the air stream injected via the air injection passages 16 that are formed in the bottom of the groove is channeled by the groove and runs along the pressure side 56, thereby enabling the critical portion 12 of the blade to be cooled effectively. Conversely, in the absence of such a groove 40, as shown in FIG. 3, the stream of injected cooling air tends to move away from the pressure side 56 immediately after it has been injected. It is therefore not possible to act effectively to cool the critical portion 12 of the blade, i.e. the junction between its trailing edge 54 and the platform surface 62.

Three embodiments of the invention are described below with reference to FIGS. 5 and 8, 6 and 9, and also 7.

FIGS. 5 to 7 are sections through blades of the invention, these sections being on the axis of the airfoil and in a direction that is substantially perpendicular to the general flow direction of the stream. FIGS. 8 and 9 show the section planes of FIGS. 5 and 6 with references V and VI (which section planes are the same for all three FIGS. 5 to 7).

In FIGS. 5 to 7, the dashed-line curve presents the section of the mean surface of revolution to which the portion of the platform surface 62 situated in the vicinity of the groove 40 approximates.

FIG. 5 shows the section of the FIG. 4 blade. The ridge 42 projects as material added to the platform surface 62. Because of the presence of this ridge 42, the groove 40 is formed between the ridge 42 and the suction side 56. As shown, the ridge 42 is in the immediate vicinity of the suction side in order to channel the injected air flow as close as possible thereto. The air flow is injected via an air injection passage 16 at the bottom of the groove 40.

FIG. 6 shows a blade in which the groove 140 is recessed, forming a depression relative to the general shape of the platform surface 62, as shown by dashed lines. Here there is no ridge.

FIG. 7 shows a blade in an embodiment that is intermediate between the embodiments of FIGS. 5 and 6. The groove 240 is arranged as a depression relative to the general shape of the platform surface 62; however the effect of the groove in guiding and channeling the injected air stream is increased by the ridge 242 that is formed to project from the general shape of the platform surface 62.

In this embodiment, the air injection passage 16 opens out into the wall of the ridge 242 that is situated facing the pressure side 56 and it points towards the pressure side so as to direct the injected air stream towards it.

FIGS. 8 and 9 are section views on planes perpendicular to the axes of the airfoils 50 of the two blades described above with reference to FIGS. 5 and 6. Each of these views shows the section of the airfoil 50 in the vicinity of the blade platform 60, where the stream passes, and at a sufficient distance from the platform to ensure that the view is indeed a section of the airfoil proper and does not include the connection surfaces or fillets 18 between the airfoil 50 and the platform 60.

In the two embodiments shown, the groove 40, 140 runs along the pressure side 56.

The extent of the groove 40, 140 may initially be evaluated in the stream flow direction. In particular, it may be quantified relative to the neutral fiber 55 of the airfoil, itself defined as running from the leading edge 52 of the airfoil to the trailing edge 54 thereof, at substantially equal distances from the two sides of the airfoil: relative to the neutral fiber 55 of the airfoil, the groove extends between the first quarter thereof and the point of the airfoil that is the furthest downstream (in the upstream to downstream direction, i.e. in the figures from a position situated up and to the right towards a position that is situated down and to the left). In particular, the groove extends at least along the downstream portion 57 of the pressure side 56. This downstream portion corresponds substantially to 40% of the neutral fiber 55 of the airfoil, at its downstream end.

In addition, as can be seen in FIGS. 5 to 7, the groove 40, 140, 240 lies at a substantially constant distance from the pressure side 56, in the immediate vicinity thereof. In section, it presents a shape that is substantially an arc or a semi-circle. This arc or semi-circle is connected on one side to the pressure side wall of the airfoil. On the other side, it is connected to the platform surface 62 via a connection surface (which comprises the surface of the ridge 42, 242 for the blades shown in FIGS. 5 and 7).

In the embodiments shown, the platform surface 62 in the vicinity of the groove (excluding the ridge if there is on) is a surface that is very slightly curved, and is substantially a surface of revolution.

Finally, in the embodiments shown in FIGS. 8 and 9, numerous air injection passages 16 are provided along the groove 40, 140 so as to deliver cooling air to the inter-airfoil channel, thereby enabling the blades to be cooled.

These air injection passages 16 are disposed substantially in line one after another at a short distance from the pressure side wall 56.

Relative to the neutral fiber 55 of the airfoil, they extend over a major fraction thereof: the first air injection passage is situated about 20% of the way along the neutral fiber, starting from the leading edge 52, while the last air injection passage 16 is situated about 90% of the way along the neutral fiber. As shown in FIGS. 8 and 9, the air injection passages may be distributed over an extent relative to the neutral fiber of the airfoil 50 that does not exceed the extent of the groove 40, 140.

What is claimed is:

1. A blade for a turbomachine bladed wheel, the blade comprising:
   an airfoil having a pressure side and a platform extending from one of the ends of the airfoil in a direction that is generally perpendicular to a longitudinal direction of the airfoil, the platform including at least one air injection passage, and a groove running along the pressure side in the vicinity at least of a downstream portion of the airfoil and formed between the pressure side and a ridge formed on the platform surface at a short distance from said downstream portion of the pressure side,
   wherein said at least one air injection passage is formed in said groove, and
   wherein the ridge projects above the platform surface towards a free end of the airfoil.

2. The blade according to claim 1, wherein the blade is suitable for being placed together with a plurality of substantially identical blades to form a ring around a ring axis in which the airfoils are disposed substantially radially, the platform surface in the vicinity of a downstream portion of the pressure side is substantially a surface of revolution about the axis of the ring, and the groove is formed as a depression relative to said surface.

3. The blade according to claim 1, wherein the groove is defined on one side by the pressure side and on the other side by the ridge.

4. The blade according to claim 1, wherein the groove extends relative to a neutral fiber of the airfoil from a first quarter of the airfoil to a point of the airfoil that is furthest downstream.

5. The blade according to claim 1, wherein the groove has multiple air injection passages distributed along the groove.

6. A bladed wheel including a plurality of blades, wherein each blade is structured according to claim 1.

7. A turbomachine including at least one bladed wheel according to claim 6.

8. A blade for a turbomachine bladed wheel, the blade comprising:
   an airfoil having a pressure side and a platform extending from one of the ends of the airfoil in a direction that is generally perpendicular to a longitudinal direction of the airfoil, the platform including at least one air injection passage, and a groove running along the pressure side in the vicinity at least of a downstream portion of the airfoil and formed between the pressure side and a ridge formed on the platform surface at a short distance from said downstream portion of the pressure side,
   wherein said at least one air injection passage is formed in said groove,
   wherein the blade is suitable for being placed together with a plurality of substantially identical blades to form a ring around a ring axis in which the airfoils are disposed substantially radially, the platform surface in the vicinity of a downstream portion of the pressure side is substantially a surface of revolution about the axis of the ring, and the groove is formed as a depression relative to said surface, and
   wherein the ridge projects above the platform surface towards a free end of the airfoil, and the at least one air injection passage is pointed toward the pressure side of the airfoil.

9. The blade according to claim 8, wherein the groove is defined on one side by the pressure side and on the other side by the ridge.

10. The blade according to claim 8, wherein the groove extends relative to a neutral fiber of the airfoil from a first quarter of the airfoil to a point of the airfoil that is furthest downstream.

11. The blade according to claim 8, wherein the groove has multiple air injection passages distributed along the groove.

12. A bladed wheel including a plurality of blades, wherein each blade is structured according to claim 8.

13. A turbomachine including at least one bladed wheel according to claim 12.

* * * * *